United States Patent [19]
Ward et al.

[11] Patent Number: 6,034,972
[45] Date of Patent: Mar. 7, 2000

[54] DISTRIBUTED LOCAL SERVICES TELECOMMUNICATIONS SWITCHING SYSTEM

[75] Inventors: Ronald L. Ward, Flower Mound; Walter C. Robertson, Jr., Richardson; Kevin W. Hager, Flower Mound, all of Tex.

[73] Assignee: Alcatel USA Sourcing, L.P., Plano, Tex.

[21] Appl. No.: 08/699,160

[22] Filed: Aug. 16, 1996

[51] Int. Cl.⁷ .................................................. H04Q 3/76
[52] U.S. Cl. ............................................ 370/522; 379/229
[58] Field of Search .................................... 370/360, 373, 370/384, 522, 524, 525, 526, 527; 379/265, 266, 229, 230, 210

[56] References Cited

U.S. PATENT DOCUMENTS

| | | | |
|---|---|---|---|
| 5,187,732 | 2/1993 | Suzuki | 379/5 |
| 5,189,673 | 2/1993 | Burton et al. | 370/522 |
| 5,425,091 | 6/1995 | Josheps | 379/201 |
| 5,495,484 | 2/1996 | Self et al. | 370/110.1 |
| 5,687,014 | 11/1997 | Czerwiec et al. | 359/123 |

*Primary Examiner*—Chau Nguyen
*Attorney, Agent, or Firm*—Baker Botts L.L.P.

[57] ABSTRACT

A distributed local services telecommunications switching system (10, 50) is comprised of loosely coupled components, including a digital loop carrier (14, 56), an intelligent peripheral (12, 54), and a general purpose computing platform (12, 52). The digital loop carrier (14, 56) provides subscriber line interfaces (120, 150), network trunk interfaces (122, 152), and a cross-connect matrix (124, 154). The intelligent peripheral (12, 54) is coupled to the digital loop carrier (14, 56) for performing call processing functions. The general purpose computing platform (12, 52) is coupled to the digital loop carrier (14, 56) and intelligent peripheral (12, 54) for controlling and managing call processing operations thereof. The general purpose computing platform (12, 52) may be integrated or co-located with the intelligent peripheral (12, 54).

2 Claims, 3 Drawing Sheets

DISTRIBUTED LOCAL SERVICES TELECOMMUNICATIONS SWITCHING SYSTEM

TECHNICAL FIELD OF THE INVENTION

This invention is related in general to the field of telecommunications systems. More particularly, the invention is related to a distributed local services telecommunications switching system.

BACKGROUND OF THE INVENTION

Local services are typically provided in today's telecommunications network by a class 5 switching system. The class 5 switch is a monolithic system generally containing a central computing unit, matrix, line modules, trunk modules, and service circuits. These components are typically tightly coupled forming a proprietary control architecture controlled by the central computing unit.

The digital loop carrier is being widely deployed to connect business and residential telephone customers to the class 5 central office switch. However, today's the central office switching systems were not initially designed with digital loop carriers or fiber optic loop equipment in mind. Nor were they designed for long holding times, extensive intelligent network signaling loads, or multimedia control. In particular, long call hold times related to the rapid rise in the volume of data calls, have resulted in increased service blockages in the end office switches.

Further, class 5 switching systems generally contain a number of standard local services or features such as Class, Centrex, and Operator Services. Because of its monolithic and tightly coupled architecture, the class 5 switching system is usually comprised of components supplied by a single equipment manufacturer. Thus, when new services or features are desired, a network operator must request their implementation from the class 5 switch manufacturer. Due to the monolithic nature of the class 5 switching system, service and feature implementation are generally tightly coupled to the architecture of the switch. Therefore, new services and features are usually very costly to implement and require significant time to market. These costs and lead times for software upgrades led to the industry architecture known as Advanced Intelligent Network in the late 1980s as a way for Local Exchange Carriers (LECs) to gain control of software development for new features. This process itself has been largely ineffective due to slow deployment and high costs.

SUMMARY OF THE INVENTION

Accordingly from the foregoing, there is a need for a telecommunications switching system that provides local services as well as the facility to add new services and features without the expenses and implementation time associated with conventional monolithic class 5 switching systems associated with conventional monolithic class 5 switching systems and their role in realizing the AIN.

In accordance with the present invention, a distributed local services telecommunications switching system and method therefor are provided which eliminates or substantially reduces the disadvantages associated with traditional central office switching systems.

In one aspect of the invention, the distributed local services telecommunications switching system is comprised of loosely coupled components, including a digital loop carrier, an intelligent peripheral, and a general purpose computing platform. The digital loop carrier provides subscriber line interfaces, network trunk interfaces, and a cross-connect matrix. The intelligent peripheral is coupled to the digital loop carrier for performing call processing functions, and the general purpose computing platform is coupled to the digital loop carrier and intelligent peripheral for controlling and managing call processing operations thereof.

In another aspect of the invention, a method for providing access to local telecommunications services uses a digital loop carrier beyond traditional functionality associated with feeder networks and subscriber line terminations, to take direct advantage of its time slot interchange matrix fabric and its ability to terminate network trunk facilities directly. An intelligent peripheral with call processing resources, such as dial tone, dual-tone multi-frequency (DTMF) receivers and senders, is provided and coupled to the digital loop carrier. A general purpose computing platform, which may be integrated with the intelligent peripheral, is further provided for controlling the digital loop carrier and intelligent peripheral for performing call processing functions.

BRIEF DESCRIPTION OF THE DRAWINGS

For a better understanding of the present invention, reference may be made to the accompanying drawings, in which.

DETAILED DESCRIPTION OF THE INVENTION

Figure 1:
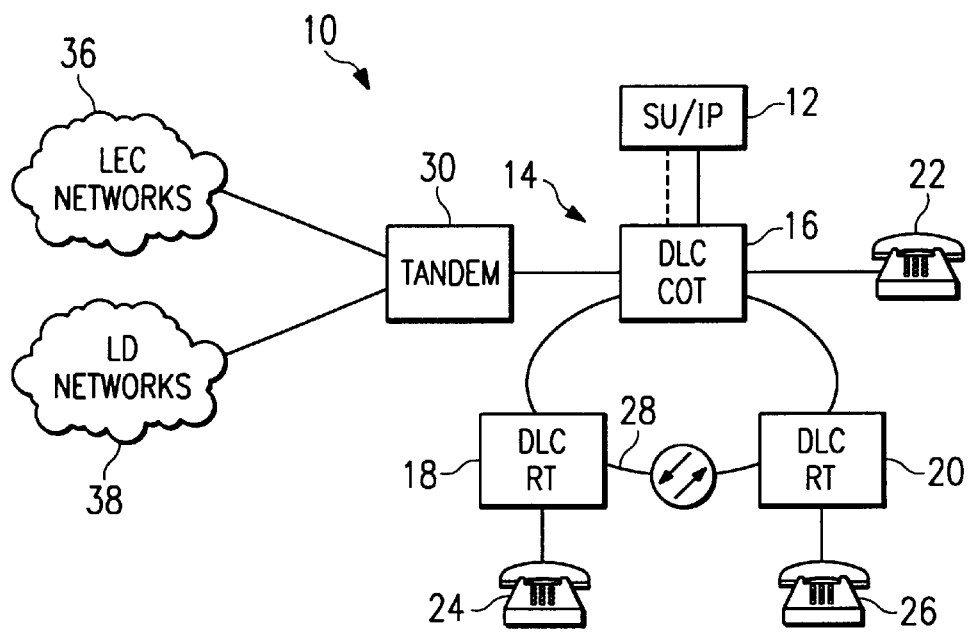
FIG. 1 is a simplified block diagram of an embodiment of a distributed local services switching system architecture according to the teachings of the present invention.

The preferred embodiment(s) of the present invention is (are) illustrated in FIGS. 1–6, like reference numerals being used to refer to like and corresponding parts of the various drawings.

Referring to FIG. 1, an embodiment of a distributed local services switching system architecture 10 is shown. Local services switching system 10 preferably includes an integrated service unit/intelligent peripheral (SU/IP) server 12, which is coupled to a central office terminal (COT) 16 of a digital loop carrier (DLC) 14. The service unit is basically a general purpose computing platform that performs the call control and management functions, and may interact with the SS7 signaling network and external network management or operations systems. The intelligent peripheral is a specialized computing platform that provides central office call processing functions such as dial tone and digit collection. The digital loop carrier 14 acts as a switching unit or delivery unit of the distributed switching system under the control of the service unit. Central office terminal 16 is further coupled to one or more remote terminals (RT) 18 and 20 via metallic, fiber or any other suitable feeder facilities 28. Telephone service subscriber equipment 22–26 may be coupled to central office terminal 16 or to remote terminals 18 and 20. Central office terminal 16 is also coupled to a tandem switch 30, which may be further coupled to local exchange carrier (LEC) networks 36 and/or long distance (LD) networks 30. It is noted that digital loop carrier 14 may also be configured as a stand-alone host digital terminal (HDT).

Figure 2:
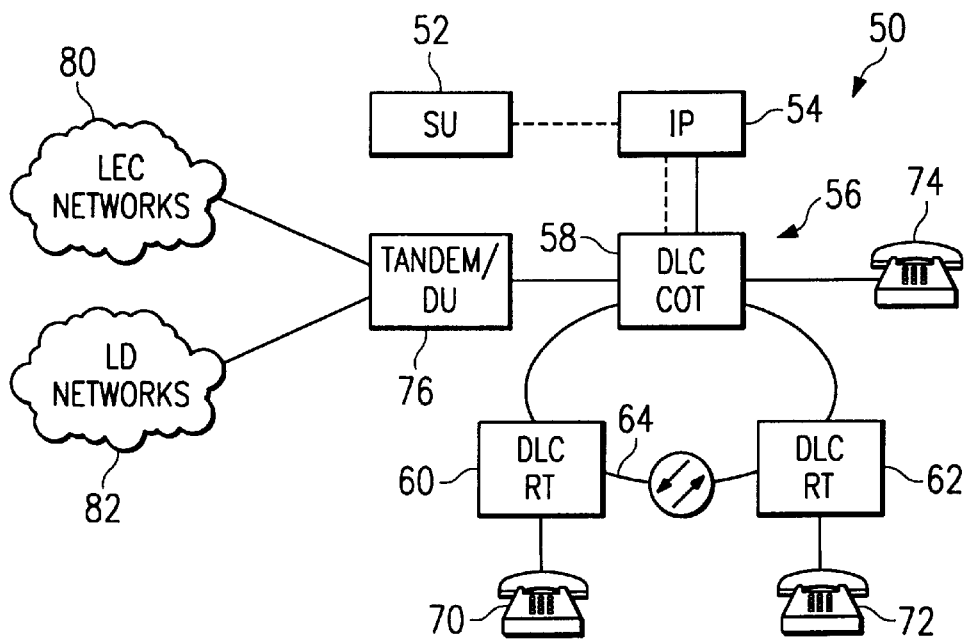
FIG. 2 is a simplified block diagram of another embodiment of a distributed local services switching system architecture according to the teachings of the present invention.

FIG. 2 shows an alternate embodiment of a distributed local services switching system 50. In this embodiment, a service unit 52 and an intelligent peripheral 54 are separate and distributed components. The dashed lines denote the path of out-of-band common channel signaling messages between service unit 52 and central office terminal 58 of digital loop carrier 56, the solid lines denote the path of voice bearer connections supporting in-band signaling codes and tones between the components. Central office terminal 58 is further coupled to optional remote terminals 60 and 62 via copper, optical or any suitable feeder facilities, which are in turn coupled to subscriber telecommunications equipment 70 and 72. Central office terminal may also be connected to subscriber equipment 74 directly and be further coupled to an access tandem switch and/or an interexchange carrier tandem or delivery unit 76 through network trunk facilities to provide interoffice call delivery. Tandem/delivery unit 76 may be coupled to local exchange carrier networks 80 and/or long distance networks 82.

Figure 3:
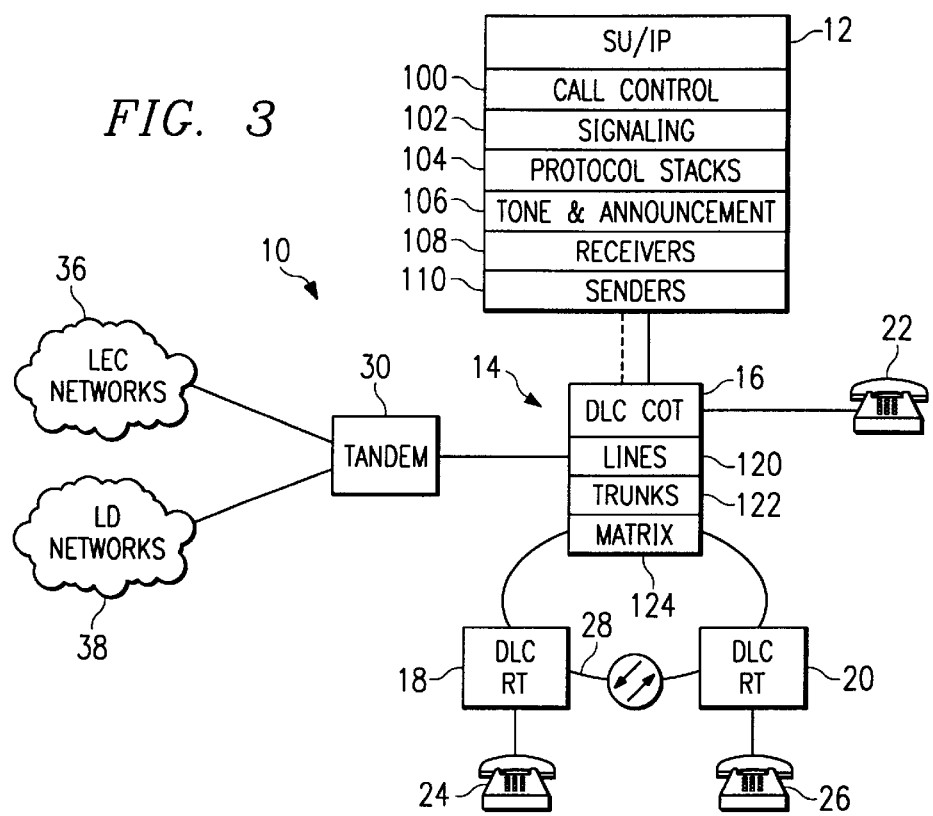
FIG. 3 is a more detailed block diagram of the first embodiment of the distributed local services switching system architecture according to the teachings of the present invention.
Figure 4:
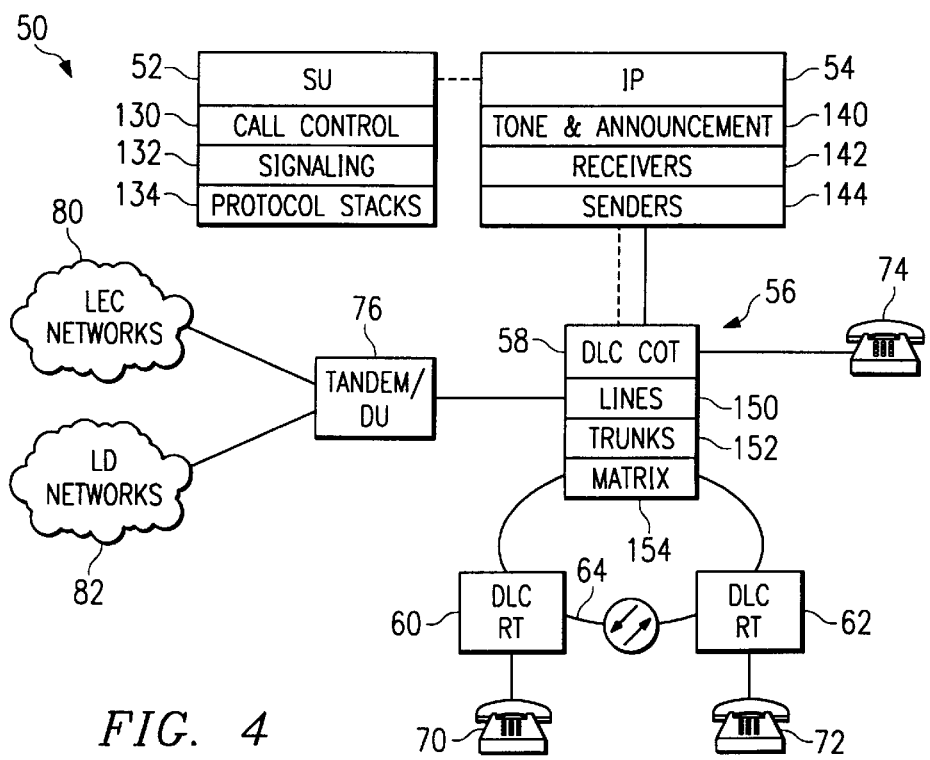
FIG. 4 is a more detailed block diagram of the second embodiment of the distributed local services switching system architecture according to the teachings of the present invention.

FIG. 3 is a more detailed functional block diagram of distributed local services switching system 10 shown in FIG. 1. Integrated service unit/intelligent peripheral 12 includes hardware and software that provide call control and management 100 and call processing resources such as signaling 102, protocol stacks 104, tone and announcement 106, and dual-tone multi-frequency (DTMF) receivers 108 and senders 110. Central office terminal 16 of digital loop carrier 14 provides line and trunk interfaces 120 and 122 as well as a cross-connect matrix 124 for making the connection between the originating and terminating lines between originating and terminating lines and trunks.

Where the service unit and intelligent peripheral are distributed and implemented in separate subsystems, as shown in FIG. 4, service unit 52 preferably provides the call control and management functions 130, signaling interfaces 132, and protocol stacks 134; and intelligent peripheral 54 preferably provides the tones, announcements, receivers, senders, and voice processing functions 140–144. Service unit 52 may also be simultaneously coupled to an interexchange carrier delivery unit to provide call control instructions to the tandem switching function. This configuration illustrates the configuration of a class 4 tandem switch using the same conceptual service unit/delivery unit separation implied by the service unit/digital loop carrier end office architecture.

For a more detailed description of the service unit, the delivery unit, and a discussion of the distributed switch architecture, please refer to U.S. Pat. No. 5,495,484 issued to Self et al. on Feb. 27, 1996 and titled *Distributed Telecommunications Switching System*, incorporated herein by reference.

The intelligent peripheral is a specialized server in the Advanced Intelligent Network (AIN) as defined by the International Telecommunication Union (ITU), the American National Standards Institute (ANSI), and Bell Communications Research (Bellcore). Intelligent peripherals are generally contemplated to provide enhanced services on the network, such as voice mail and voice recognition. However, the teachings of the present invention extends the role of the intelligent peripheral to include basic tone and announcement resources found in the traditional central office switch.

Constructed in this manner, those functions that were carried out in the traditional central office switch are divided among three components in the Advanced Intelligent Network. In operation, the digital loop carrier monitors the lines for events. When an offhook condition on a line is detected, the event is reported to the service unit. The service unit instructs the digital loop carrier to connect the call to the intelligent peripheral, so that the intelligent peripheral can turn on dial tone and collect dialed digits. The intelligent peripheral then reports the collected digits to the service unit, which translates the digits into a destination address that may be another line on the digital loop carrier. The service unit thus instructs the digital loop carrier with the ring cadencing required to ring the terminating line. The intelligent peripheral communicates this instruction to the digital loop carrier through an inband bearer signaling channel, under control of the service unit. The digital loop carrier then reports an offhook condition to the service unit when the subscriber at the terminating line picks up the telephone receiver or otherwise turns it on. The service unit then instructs the digital loop carrier to make a matrix connection between the originating and terminating lines to connect the telephone subscribers. Preferably existing in-band and common signaling channel protocol defined in *Integrated Digital Loop Carrier System General Requirements, Objectives, and Interface GR*-303-*CORE* (hereinafter referred as GR-303) with extended commands is used in the communications between the service unit and the intelligent peripheral to/from the digital loop carrier. Between the service unit and the intelligent peripheral, communications are based in Bellcore SR-3511 with command extensions. Dashed lines in FIGS. 1–4 illustrate common channel communications, and solid lines indicate in-band signaling/bearer connections.

Figure 5:
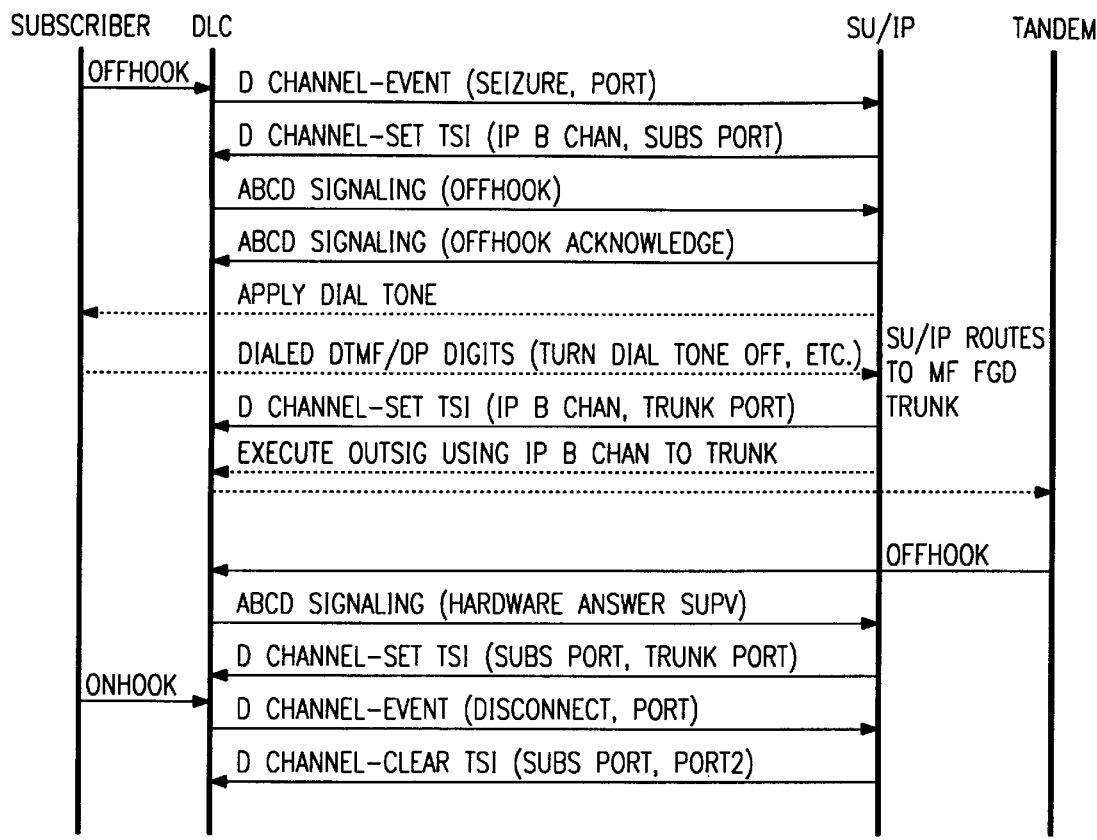
FIG. 5 is a timing and signal flow diagram of an exemplary line to trunk call according to the teachings of the present invention.
Figure 6:
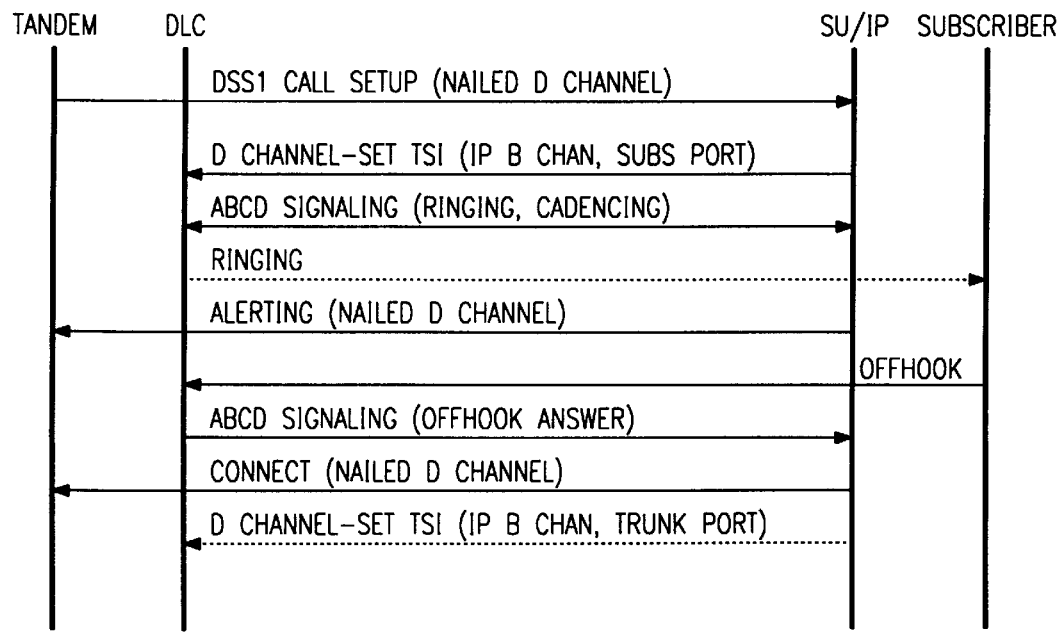
FIG. 6 is a timing and signal flow diagram of an exemplary trunk to line call according to the teachings of the present invention.

FIGS. 5 and 6 are timing and signal flow diagrams of an exemplary call processing, where common control channel communications are labeled as D channel messages, using the metaphor of ISDN. FIG. 5 illustrates an exemplary line to trunk call using multifrequency (MF) Feature Group D signaling. The digital loop carrier monitors the lines for events. When an offhook condition is detected, the event is reported to the service unit as a common channel control message, "EVENT (SEIZURE, PORT)," which specifies the subscriber port of the offhook equipment. Common channel control messages are preferably logically terminated on the service unit, and physically terminated on either the service unit or the intelligent peripheral. Upon receipt of the EVENT message, the service unit instructs the digital loop carrier to connect the call to the intelligent peripheral with the common channel control message, "SET TSI (IP B CHAN, SUBS PORT)." The SET TSI (time slot interchange) message instructs the matrix in the digital loop carrier to make a matrix connection between the ports specified as the parameters, in this case, the intelligent peripheral and the subscriber port. As discussed above, in FIGS. 1–4, the dashed lines denotes the path of out-of-band messages between the digital loop carrier and the service unit, and the solid lines denote the path of in-band signaling and bearer connections between the components.

Thereafter, in-band ABCD signaling codes are used between the intelligent peripheral and the digital loop carrier to communicate subscriber on-hook and off-hook events and in-band trunk supervision (propagated by the DLC between interoffice network switches and the intelligent peripheral). A, B, C, and D are bits robbed from each time slot of frames 6, 12, 18, and 24, respectively of the DS1 ESF (extended super frame) format. Details of ABCD codes are described in GR-303. The service unit instructs the intelligent peripheral through a common channel signaling message to apply dial tone and collect dialed address digits. A dial tone is applied to the subscriber port, and dialed digits are collected and reported to the service unit. The service unit then translates the collected digits into a destination address, which may be to another network. In this case, the service unit selects an outgoing circuit to the tandem switch. The service unit instructs the matrix fabric in the digital loop carrier to make a connection between the intelligent peripheral and outgoing trunk with the out-of-band D channel message, "SET TSI (IP B CHAN, TRUNK PORT)". The service unit instructs the intelligent peripheral to signal through the digital loop carrier to the outgoing trunk. Once this operation is complete, the service unit releases that connection and instructs the digital loop carrier to connect the originating line to the outgoing trunk with a D channel message "SET TSI (SUBS PORT, TRUNK PORT)". When the far end answer condition is detected, it is relayed by the tandem switch to the digital loop carrier, where it is propagated through to the intelligent peripheral bearer/in-band channel. The IP reports the event to the service unit through a common control channel message. When the originating party subsequently goes onhook, a common channel control message, "EVENT (DISCONNECT, PORT)", is sent from the digital loop carrier to the service unit, which responds by sending a common channel control message "CLEAR TSI (PORT1, PORT2)" message to the digital loop carrier to instruct it to end the matrix connection between the line and the outgoing circuit.

FIG. 6 shows an exemplary time and signal flow diagram of a trunk to line call. In this case, a DSS1 call setup message is received by the service unit from the tandem switch. The service unit verifies that the terminating line is idle and then instructs the digital loop carrier with an out-of-band "SET TSI (IP B CHAN, SUBS PORT)" message to make a connection from the intelligent peripheral to the terminating line for ringing and cadencing. The service unit instructs the intelligent peripheral to apply ringing to the subscriber. When the terminating party answers the telephone call, it is reported by the digital loop carrier to the service unit. The service unit instructs the digital loop carrier to release the intelligent peripheral to terminating line connection and to make a connection between the incoming trunk to the terminating line with the out-of-band "SET TSI (SUBS PORT, TRUNK PORT)" message.

It is worthwhile to state that the timing and signal flow diagrams shown in FIGS. 5 and 6 are exemplary to demonstrate the operations of the distributed local services switching system. According to the teachings of the invention, out-of-band messages issued by the service unit are capable of directly instructing what matrix connections are to be made by the digital loop carrier between the intelligent peripheral, and originating and terminating lines and trunks. This open architecture provides a loosely coupled local services switching system to substitute for the monolithic central office switch. With this architecture, new telecommunications services and features can be implemented and integrated quickly.

Although the present invention and its advantages have been described in detail, it should be understood that various changes, substitutions and alterations can be made therein without departing from the spirit and scope of the invention as defined by the appended claims.

What is claimed is:

1. A method for providing access to local telecommunications services, comprising the steps of:

monitoring for line events occurring on a plurality of subscriber lines;

making a matrix connection between an originating subscriber line and an intelligent peripheral in response to a line event occurring on said originating subscriber line;

turning on dial tone and collect dialed digits;

translating the collected dialed digits into a destination address for a terminating subscriber line;

providing ring cadence for the terminating subscriber line;

detecting the terminating subscriber line for an offhook condition; and making a matrix connection between the originating subscriber line and the terminating subscriber line in response to the detected offhook condition.

2. The method, as set forth in claim 1, wherein the collected dialed digit translation step includes producing a destination address for a terminating subscriber line on another network, and the method further comprising the steps of:

making a matrix connection between the intelligent peripheral and an outgoing trunk, and instructing the intelligent peripheral to signal through a digital loop carrier to the outgoing trunk; and making a matrix connection between the originating subscriber line and the outgoing trunk.

* * * * *